J. HUNDHAUSEN AND W. TRANTOW.
TRUNK.
APPLICATION FILED MAY 8, 1919.
1,323,865.
Patented Dec. 2, 1919.
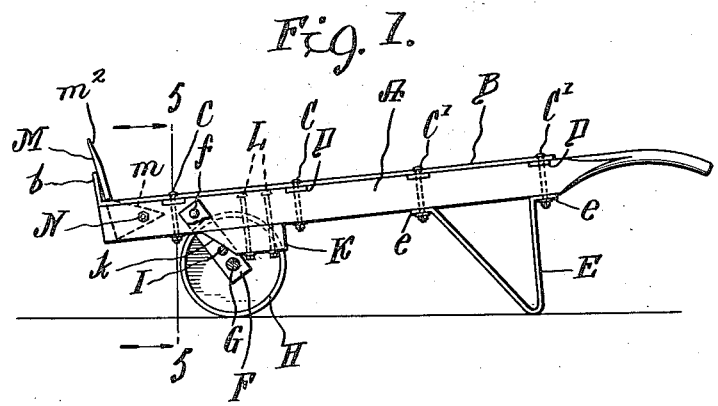
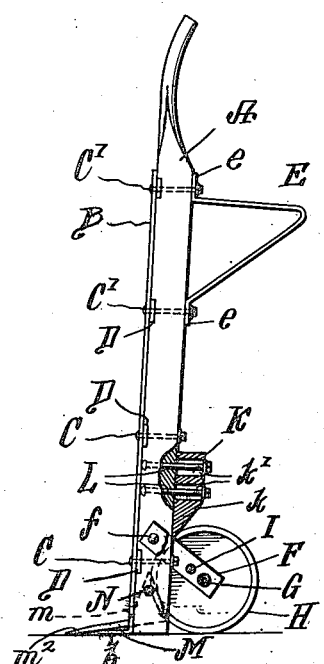
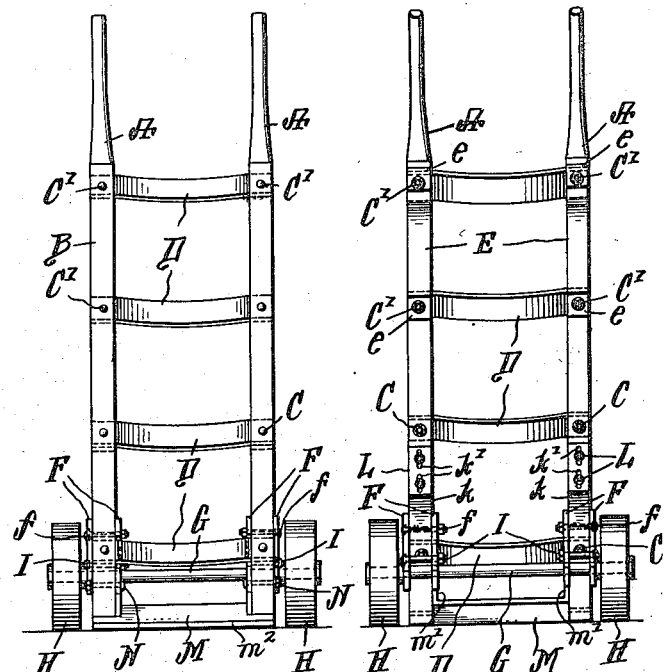
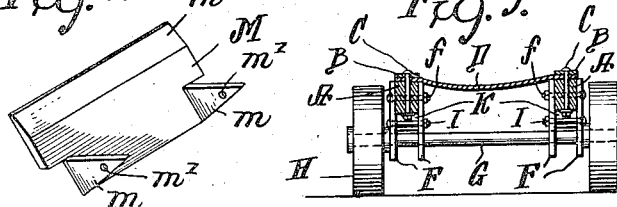
Inventors.
Joseph Hundhausen
and Wesley Trantow.
by Wilkinson + Ginsta,
Attorneys.

UNITED STATES PATENT OFFICE.

JOSEPH HUNDHAUSEN AND WESLEY TRANTOW, OF WAUSAU, WISCONSIN, ASSIGNORS, BY DIRECT AND MESNE ASSIGNMENTS, TO JOHN A. WIENER, OF WAUSAU, WISCONSIN.

TRUCK.

1,323,865.     Specification of Letters Patent.     Patented Dec. 2, 1919.

Application filed May 8, 1919. Serial No. 295,584.

*To all whom it may concern:*

Be it known that we, JOSEPH HUNDHAUSEN and WESLEY TRANTOW, citizens of the United States, residing at Wausau, in the county of Marathon and State of Wisconsin, have invented certain new and useful Improvements in Trucks; and we do hereby declare the following to be a full, clear, and exact description of the invention, such as will enable others skilled in the art to which it appertains to make and use the same.

Our invention relates to improvements in hand operated trucks for use in transporting heavy packages, more especially those that are cylindrical in shape or circular in cross section, such as heavy rolls of paper as made at the paper mills, casks, barrels, or the like.

Our invention will be more fully understood after reference to the accompanying drawings, in which like parts are indicated by similar reference symbols throughout the several views, and in which:—

Figure 1 is a side elevation of the truck, one of the wheels being removed and one of the frames supporting the axle being broken away, for the sake of clearness in the drawings.

Fig. 2 is a similar view of Fig. 1, but shows the truck in the position for taking on its load, and parts being broken away.

Fig. 3 is a front view of the truck in the position shown in Fig. 2.

Fig. 4 is a rear view of the truck in the position shown in Figs. 2 and 3.

Fig. 5 shows a section along the line 5—5 of Fig. 1, and looking in the direction of the arrows; and Fig. 6 is a detail showing in perspective the pivoted scoop plate attached to the forward end of the truck.

A, A represent the two handle bars having the usual handles at the rear end thereof, and connected together by curved bottom plates D, the ends of which are held beneath the reinforcing plates B and are secured to the handle bars by means of the screw bolts C and C', which pass through said said plates B and D and the handle bars, and are secured beneath the handle bars by nuts.

The forward end of each of these reinforcing bars B is flanged upward, as shown at $b$, for reasons that will be hereinafter described.

E, E represent the supporting legs which are preferably in the form of a bent plate, as shown in Fig. 2, having flanged ends $e$ connected to the handle bars by means of the bolt C', which bolts also pass through the reinforcing plates B and bottom plates D.

Frames F are pivoted at $f$ to the handle bars near their forward ends, and in these frames the axle G is journaled, carrying the wheels H. Each of these frames has a cross bolt or stop bar I, adapted to engage the wedge face $k$ of the adjustable block K which is preferably slotted, as at $k'$ so that it may be adjustably mounted beneath the corresponding handle bar to which it is attached as by means of the securing bolts L shown most clearly in Fig. 2. Thus, these blocks may be adjusted through a limited distance longitudinally, relative to the handle bars A and may be clamped in the desired position.

The axle G bearing the wheels H swings with the frames F, and when the truck is in the position for supporting the load, as shown in Fig. 1, the stop bars I of the frames F bear against the wedge faces $k$ of the two blocks K, one of which blocks, in the proper relation, is shown in Fig. 1.

M represents a scoop plate, which has arms $m$ pivoted, as at $m'$, to the pins N carried by the handle bars A, and the upper edge of this scoop plate M is tapered, as at $m^2$, see Fig. 6, so that the scoop plate may be more conveniently shoved beneath the edge of the head of the roll of paper, or chine of the barrel, cask, or the like.

In operating the device let us assume that the roll of paper, the barrel, or the cask, is resting on its flat head and it is desired to load the same onto the truck.

Run the truck close up to the article and turn it to the position shown in Fig. 2, the scoop plate M will then rest on the platform and the frames F will swing down to the position shown in Fig. 2, permitting the wheels also to rest on the platform or floor.

The inclined face $m^2$ of the scoop plate M may be readily adjusted beneath the edge of the article, and by swinging the truck from the position shown in Fig. 2 to the right, or to the position shown in Fig. 1, the wheels and frames F, acting as a short lever arm relative to the handles, will enable the load to be readily lifted and the wheels will then assume the position shown in Fig. 1, when the stop bars I will engage the wedge faces $k$ of the blocks K.

The weight of the truck will tend to keep these stop bars I in engagement with the faces $k$ until the truck is swung once more to the position shown in Fig. 2, which would be the case when the load is dumped from the same. By adjusting the position of the blocks K, the position of the axle, relative to the center of gravity of the load, may be varied. Obviously, the axle should be farther forward where short articles are to be transported than where long articles are to be transported; in other words, it is desirable to have the weight of the load carried as far as practicable by the axle and not supported from the handles.

It will be obvious that various modifications might be made in the herein described apparatus, and in the construction, combination and arrangement of parts which could be used without departing from the spirit of our invention; and we do not intend to limit the invention to such details except as particularly pointed out in the claims.

Having thus described our invention what we claim and desire to secure by Letters Patent of the United States is:—

1. In a truck of the character described, the combination with a pair of handle bars, and a pair of wedge shape blocks secured beneath said handle bars near their forward ends, with means for adjusting the position of said blocks longitudinally of said handle bars, of a pair of swinging frames pivoted beneath said handle bars in front of said blocks, and provided with stop bolts adapted to engage said blocks, an axle journaled in said swinging frames, and wheels carried by said axle, substantially as described.

2. In a truck of the character described, the combination with a pair of handle bars, and a pair of wedge shape blocks secured beneath said handle bars near their forward ends, with means for adjusting the position of said blocks longitudinally of said handle bars, of a pair of swinging frames pivoted beneath said handle bars in front of said blocks, and provided with stop bolts adapted to engage said blocks, a scoop plate pivoted across said truck near its forward end, an axle journaled in said swinging frames, and wheels carried by said axle, substantially as described.

3. In a truck of the character described, the combination with a pair of handle bars, downwardly curved bottom plates spanning said handle bars, and a pair of wedge shape blocks secured beneath said handle bars near their forward ends, with means for adjusting the position of said blocks longitudinally of said handle bars, of a pair of swinging frames pivoted beneath said handle bars in front of said blocks, and provided with stop bolts adapted to engage said blocks, a scoop plate pivoted across said truck near its forward end, an axle journaled in said swinging frames, and wheels carried by said axle, substantially as described.

4. In a truck of the character described, the combination with a pair of handle bars, downwardly curved bottom plates spanning said handle bars, and a pair of wedge shape blocks secured beneath said handle bars near their forward ends, with means for adjusting the position of said blocks longitudinally of said handle bars, of a pair of swinging frames pivoted beneath said handle bars in front of said blocks, and provided with stop bolts adapted to engage said blocks, an axle journaled in said swinging frames, and wheels carried by said axle, substantially as described.

JOSEPH HUNDHAUSEN.
WESLEY TRANTOW.